United States Patent
Bodtländer et al.

(10) Patent No.: US 8,602,471 B2
(45) Date of Patent: Dec. 10, 2013

(54) CONTAINER CLAMP OR CLIP

(75) Inventors: Renate Bodtländer, Guldental (DE); Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 304 days.

(21) Appl. No.: 13/148,333

(22) PCT Filed: Oct. 15, 2010

(86) PCT No.: PCT/EP2010/006313
§ 371 (c)(1),
(2), (4) Date: Aug. 8, 2011

(87) PCT Pub. No.: WO2011/047808
PCT Pub. Date: Apr. 28, 2011

(65) Prior Publication Data
US 2011/0308666 A1    Dec. 22, 2011

(30) Foreign Application Priority Data
Oct. 22, 2009    (DE) .......................... 10 2009 050 393

(51) Int. Cl.
*B65G 47/84*    (2006.01)
(52) U.S. Cl.
USPC ..... 294/192; 294/198; 198/803.6; 198/803.7; 198/803.9
(58) Field of Classification Search
USPC ........ 198/803.3, 803.6, 803.7, 803.9, 867.05, 198/867.08, 867.14; 294/65.5, 192, 198; 901/31, 36
See application file for complete search history.

(56) References Cited

U.S. PATENT DOCUMENTS

| | | | | |
|---|---|---|---|---|
| 4,172,514 A * | 10/1979 | Shantz et al. | ............... | 198/470.1 |
| 4,638,906 A * | 1/1987 | Winiasz | .................... | 198/803.9 |
| 4,968,081 A * | 11/1990 | Beight et al. | .................. | 294/104 |
| 5,697,480 A * | 12/1997 | Herbermann et al. | ..... | 192/56.32 |
| 5,743,377 A * | 4/1998 | Kronseder | ................ | 198/803.9 |
| 5,893,700 A * | 4/1999 | Kronseder | ................ | 414/744.2 |
| 6,557,695 B2 * | 5/2003 | Gerber et al. | ............. | 198/473.1 |
| 7,661,522 B2 | 2/2010 | Hausladen | | |
| 7,743,907 B2 | 6/2010 | Weinbrenner et al. | | |
| 7,784,603 B2 * | 8/2010 | Burgmeier | ................ | 198/472.1 |
| 7,849,998 B2 * | 12/2010 | Langlois et al. | ........... | 198/803.9 |
| 8,020,690 B2 * | 9/2011 | Asma | ......................... | 198/470.1 |
| 8,128,142 B2 * | 3/2012 | Glotzl | ........................... | 294/116 |
| 8,297,671 B2 * | 10/2012 | Knieling et al. | ................. | 294/90 |
| 8,387,773 B2 * | 3/2013 | Fahldieck | ................ | 198/472.1 |
| 8,413,799 B2 * | 4/2013 | Bodtlander | ............. | 198/867.02 |
| 8,439,413 B2 * | 5/2013 | Cirio | ............................ | 294/116 |
| 2011/0042537 A1 | 2/2011 | Fahldiek | | |

FOREIGN PATENT DOCUMENTS

| | | |
|---|---|---|
| DE | 202005002470 | 11/2005 |
| DE | 102005032175 | 1/2007 |
| DE | 102005041929 | 3/2007 |
| DE | 202006004641 | 8/2007 |

(Continued)

*Primary Examiner* — Douglas Hess
(74) *Attorney, Agent, or Firm* — Occhiuti Rohlicek & Tsao LLP

(57) ABSTRACT

The invention is a new container clip or clamp in a container conveying apparatus which is designed to have only a single clamp out of a group of clamps to release a container in the case of a failure of the single clamp thereby allowing the remainder of the system to continue. The invention includes a bearing block having holding elements and in the event of exceeding a lateral pivoting range the holding elements are at least partially detached from the bearing block to be released so as to pivot sideways.

12 Claims, 4 Drawing Sheets

(56) References Cited

FOREIGN PATENT DOCUMENTS

Figure 1:
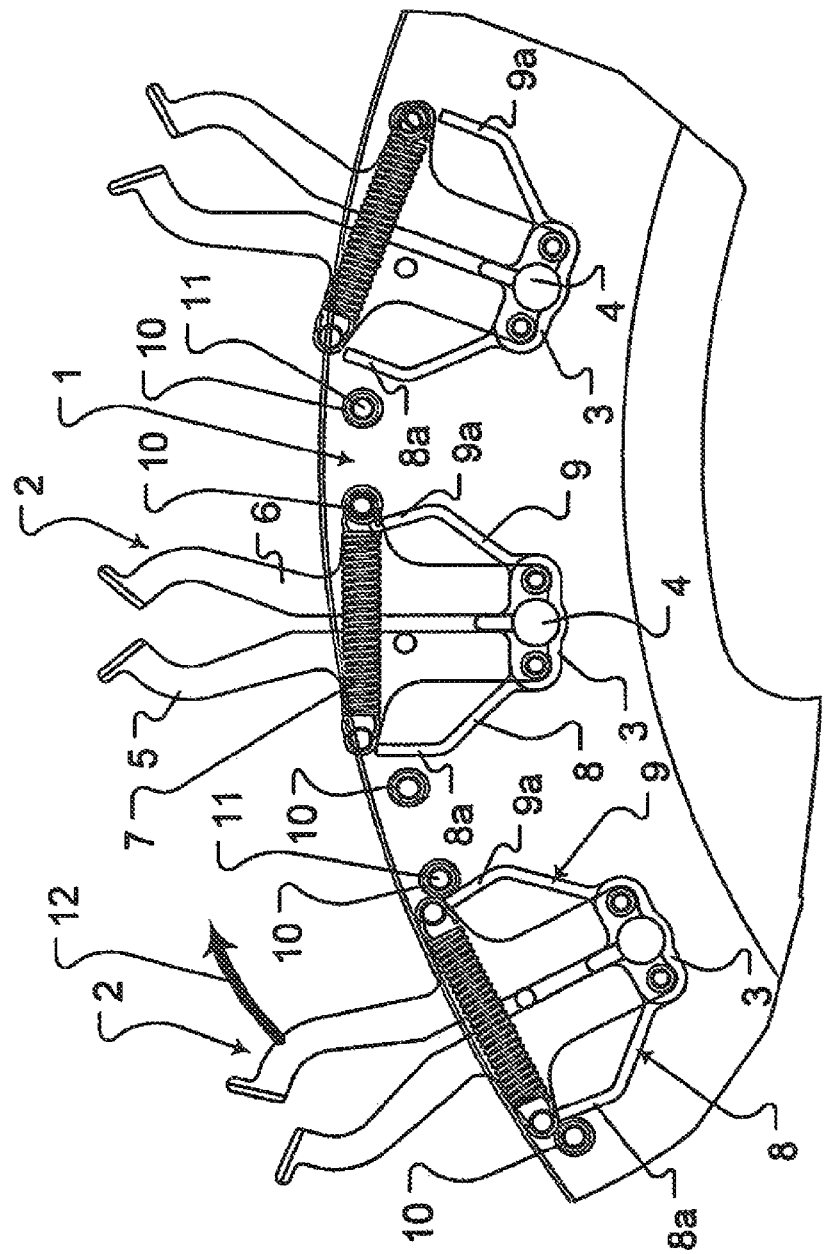

| | | |
|---|---|---|
| DE | 102006012020 | 9/2007 |
| DE | 202006018379 | 1/2008 |
| DE | 102008019766 | 4/2009 |
| EP | 1999048 | 12/2008 |
| WO | 03/068643 | 8/2003 |

* cited by examiner

CONTAINER CLAMP OR CLIP

CROSS-REFERENCE TO RELATED APPLICATIONS

This application is the National Stage of International Application No. PCT/EP2010/006313, filed on Oct. 15, 2010, which claims the benefit of the priority date of German Patent Application No. 10 2009 050 393.5, filed on Oct. 22, 2009. The contents of both applications are hereby incorporated by reference in their entirety.

Container clamps in such container filling systems are known in very different design embodiments, whether as passive gripper elements or as active clamps for example to grip a neck of PET bottles, the invention not being confined to this particular application. The DE 10 2005 032 175 A1, DE 20 2005 002 470 U1, DE 20 2006 004 641 U1 or the DE 20 2006 018 379 U1, which exhibit a number of container clamp or clip constructions, are cited merely by way of examples of the state of the art.

There are applications wherein it is possible, with directly blocked systems for example (blower machine transfers bottles over multiple star wheels without a buffer zone into the filler), for an inexact bottle transfer to occur because of tolerances, e.g. brought about by asynchronously running star wheels. Depending on the transfer situation, forces can occur in the case of a mis-transfer which are so strong that the installation is damaged, not just that the individual grippers are destroyed, but that extensive damage can be done to the whole installation in the transfer area.

This is where the invention comes in, whose object is to protect such installations with special clamping designs such that at most the failure of only a single clamp is sustained but the installation is not otherwise damaged.

With a container clamp or container clip of the type described at the beginning, this object is achieved according to the invention by the bearing block of each clamp or each clip comprising holding elements which detach at least partially from the bearing and holding device when a lateral pivoting range or a lateral force is exceeded, whereby the bearing block or the container clamp or container clip is released to swing aside. The bearing block and/or the container clamp or container clip is held on the transport element such that the bottle is not thrown out uncontrollably after partial detachment.

This protection device ensures that if there are errors in the system due either to excessive pivoting ranges or to excessive force, the individual clamp is released and is able to swing out of its engaged position without the whole installation being damaged.

Embodiments of the invention are given in the dependent claims. Thus for example a practicable design configuration consists in the bearing and holding device comprising at least one bearing element and at least one, in particular two, holding elements, wherein the at least one bearing element and the at least one holding element can be formed in the shape of lips or pegs.

According to the invention one of the possible embodiments of the fixing of the bearing block which comprises the container clamp or container clip is that the bearing of this block can be designed in the manner of a bayonet fitting. As a result of this design it is possible that if a certain angle of rotation is exceeded, the bearing block is released in the manner of a bayonet and can for example swing aside without the rest of the installation being damaged.

A very practicable embodiment of the invention consists in the bearing block being provided with moulded-on arms, each of which being attached by a fixing element to a further peg, wherein the moulded-on arms snap back through elastic deformation at a predetermined break point when a lateral pivoting range is exceeded, and the bearing block is magnetically held on a peg.

A variation on the embodiment of the container clamp according to the invention consists in the length of at least the arm that is in front in the direction of motion on the bearing block being dimensioned so that under the application of a lateral pressure the arm slides by the fixing peg and springs off the fixing peg to release the block. At the same time, it is practicable if both arms are of a length that allows them to spring off the fixing peg. It is practicable for the arms on the bearing block to be formed from an elastically flexible material.

The invention provides conveying elements with container clamps which are embodied as previously described, wherein such a conveying element is characterised by being designed as a rotatively driven transport star wheel.

Other attributes, details and advantages of the invention are indicated by the following description and by reference to the drawings. This is shown in FIG. 1 bottom view of a section of a star wheel with three clamps in different pivot positions, FIG. 2 a spatial representation of the section according to FIG. 1, and in FIG. 3 a spatial bottom view under the star wheel according to FIG. 2.

Figure 4:
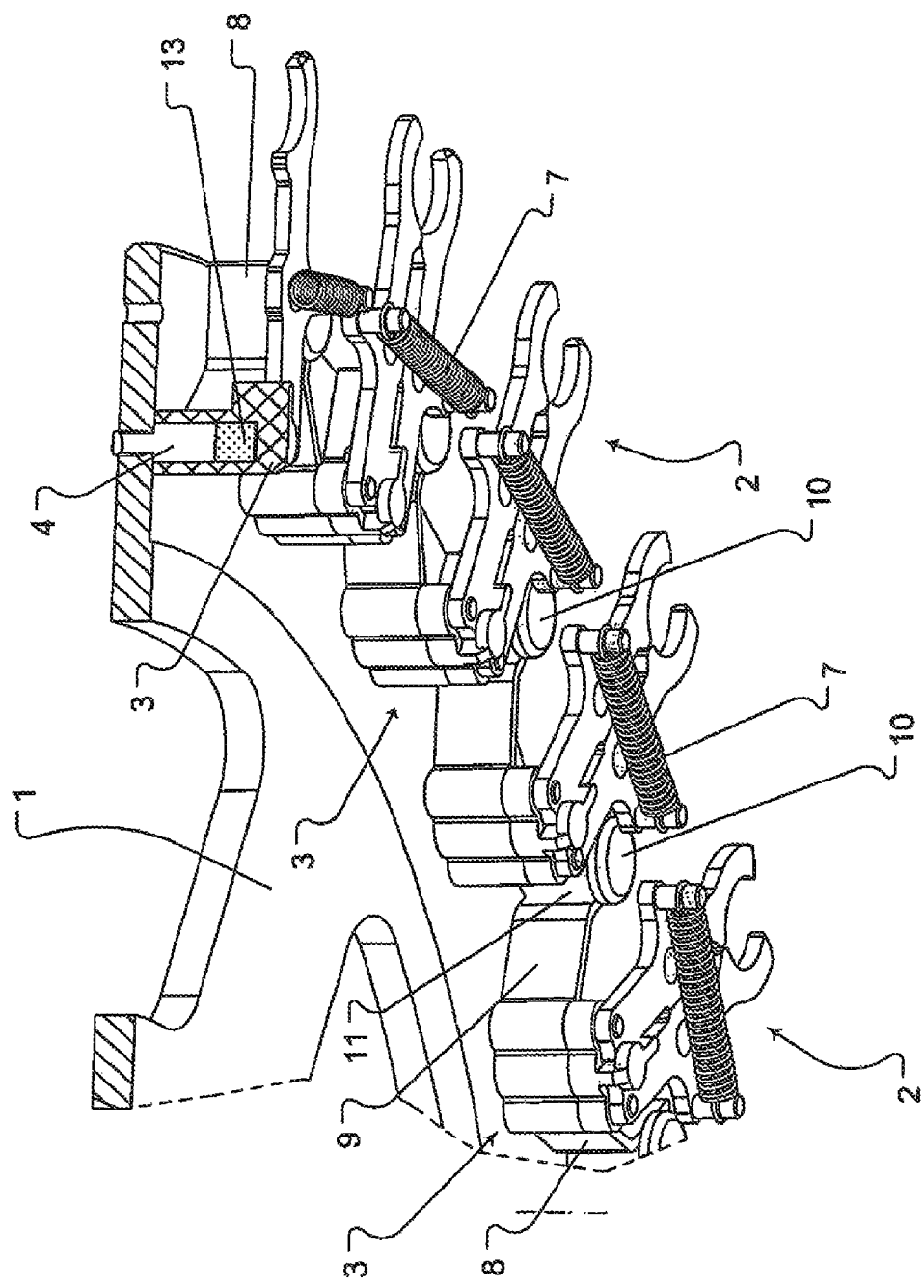

FIG. 4 shows the holding device in a cutaway and partial section.

A star wheel generally designated as 1 of a bottle filling installation is equipped with a plurality of container clamps or container clips, hereafter designated as "clamp 2", with only three clamps 2 being shown in the figures.

Clamps 2 have a bearing block generally designated as 3, which can rotate on a pivot 4 that constitutes a fixed part of star wheel 1. As well as the two clamp arms 5 and 6 which are positioned so they can pivot on bearing block 3, and which in the illustrated examples are held together by a tension spring 7, bearing block 3 exhibits two externally moulded-on bearing elements configured as arms 8 and 9 which, starting from bearing block 3, extend out towards the engagement opening of clamp arms 5 and 6.

In their normal position these bearing arms rest on plate-like heads 10 which are attached to holding pegs 11 also immovably fixed to star wheel 1, in such a way that clamps 2 are held beneath the dish of the star wheel.

To be able to exchange the clamps, the two arms 8 and 9 just need to be squeezed together to allow the clamp to be pulled downwards off pivot 4.

This type of mounting is used by the invention to effect an automatic sideways swinging of the clamp concerned from star wheel 1 if a certain force on clamps 2 is exceeded.

Figure 2:
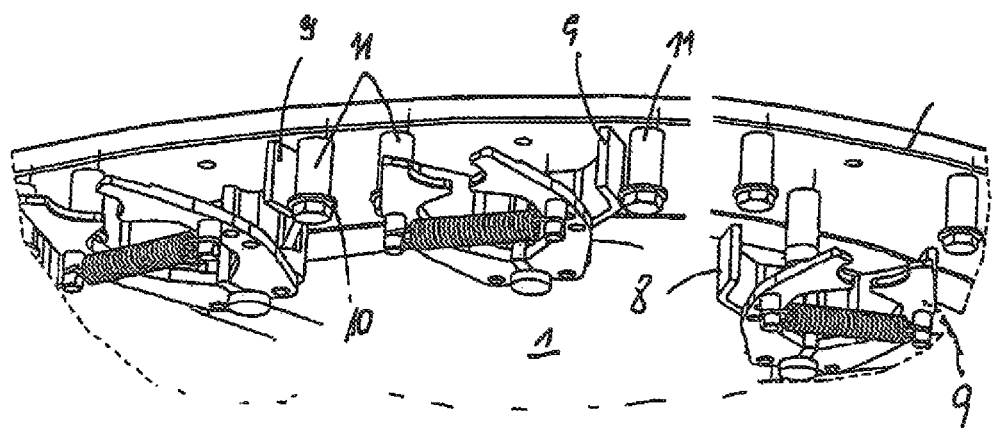
Figure 3:
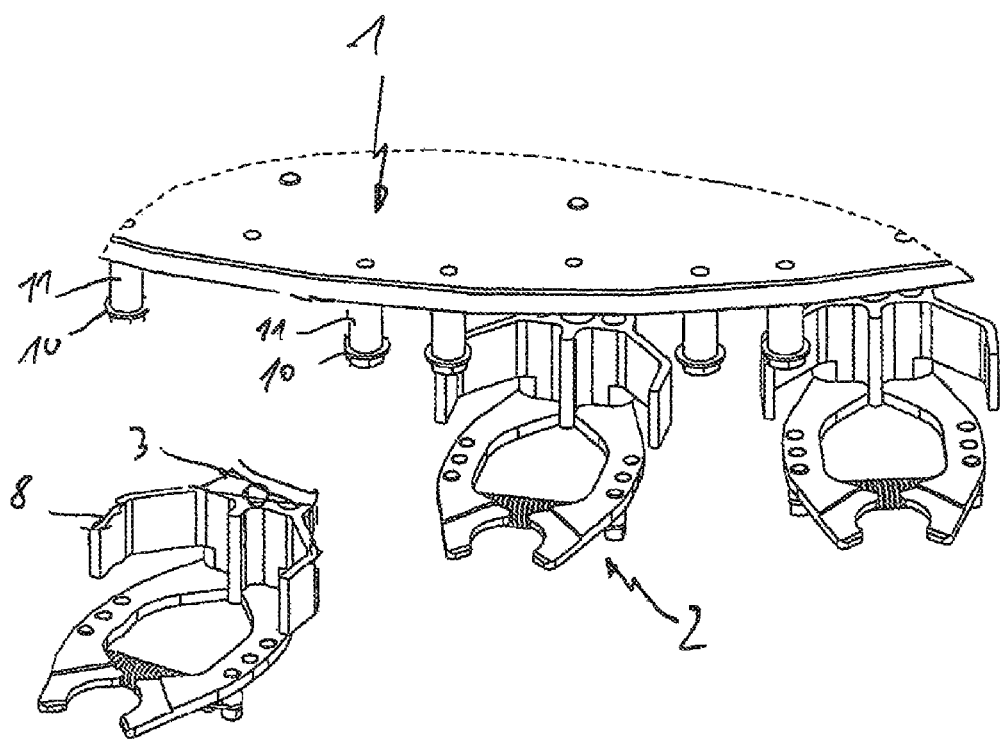

As shown for example in FIG. 1, the free ends 8a and 9a of arms 8 and 9 initially rest on holding lips 10 of respective holding pegs 11, and hold clamp 2 in position. If a force is now applied say in the direction of arrow 12 in FIG. 1 to clamp 2, the latter rotates in pivot 4 such that initially free end 8a of arm 8 detaches from holding lip 10, while free end 9a of opposite arm 9 is still in contact with the associated holding lip 10. Continuing to apply the force will result in the right-hand position in FIG. 1 of the clamp concerned, i.e. both free ends 8a and 9a of arms 8 and 9 detach from holding lip 10 by sliding past the allocated holding peg 11, thereby releasing clamp 2 including bearing block 3, as indicated in FIGS. 2 and 3.

FIG. 4 shows the securing of clamp 2 and/or of bearing block 3. The elements shown in FIG. 4 and not individually listed below with their references have exactly the same names and meanings as already used in conjunction with the description of FIGS. 1-3. As shown in FIG. 4, pivot 4 is fixed in star wheel 1 and consists of a magnetisable material, usually a magnetisable steel or iron material. A permanent magnet 13 which interacts with magnetisable pivot 4 and holds it on star wheel 1 is glued or clamped in bearing block 3.

The holding force of permanent magnet 13 is selected such that even after swinging aside under lateral overload, chamber 2 with a bottle engaged is still held securely. It goes without saying of course that all or part of pivot 4 can also be made of a magnetic material and that a magnetisable steel or iron material can be arranged in bearing block 3 or two magnets arranged on pivot 4 and in bearing block 3 in such way that they interact in a similar manner.

The described embodiment of the invention can of course be modified in many different respects without departing from the basic idea. Thus the invention is in particular not confined to a certain form of clamp 2, and in particular not confined to whether the latter is equipped with springs or can exert the clamping force solely by virtue of its own elasticity, the manner of the fixing 11 and the form of the corresponding lips 10 to retain the free ends 8a and 9a of the arms 8 and 9 can be designed differently, say as lips moulded on to the peg in a single piece and more suchlike.

The invention claimed is:

1. An apparatus for receiving a neck of a container, said apparatus comprising a container clamp or container clip on a conveying element in a container filling installation, said container clamp or container clip including:
   a bearing block held on an underside of the conveying element on a bearing-and-holding device provided thereon, said bearing block being mounted on a pivot so as to be able to rotate or swivel, said bearing block including
   holding elements that detach at least partially from the bearing-and-holding device when a lateral pivoting range or a lateral force is exceeded,
   whereby the bearing block or the container clamp or container clip is released to swing aside and is held to the pivot and against falling down by at least one magnetic element.

2. The apparatus of claim 1, wherein the pivot comprises a magnetic material, the apparatus further comprising a permanent magnet in a bearing block opposite a free end of the pivot.

3. The apparatus of claim 2, wherein the pivot comprises a magnetic steel.

4. The apparatus of claim 1, wherein the bearing-and-holding device comprises at least one bearing element and at least one holding element.

5. The apparatus of claim 4, wherein the bearing-and-holding device comprises at least two holding elements.

6. The apparatus of claim 4, wherein the at least one bearing element is configured in the form of a web and the at least one holding element is configured in the form of a peg.

7. The apparatus of claim 1, wherein a bearing of the bearing block is configured as a bayonet fitting.

8. The apparatus of claim 1, wherein the bearing block comprises moulded-on arms, each of which is retained by a bearing element on each of a further holding element, and wherein when a lateral pivoting range is exceeded, the moulded-on arms snap back at a predetermined break point through elastic deformation, thereby releasing the bearing block to be swung aside on the pivot.

9. The apparatus of claim 8, wherein the length at least of the arm on the bearing block that is in front in the direction of motion is dimensioned such that when a lateral pressure is applied thereon, the arm slides past the holding element with a holding lip and springs off the holding element to swing the bearing block aside.

10. The apparatus of claim 8, wherein both arms exhibit a length that allows springing off the holding elements.

11. The apparatus of claim 8, wherein at least one of the arms comprises an elastically flexible material.

12. The apparatus of claim 1, wherein the conveying element comprises a transport star wheel driven to rotate.

* * * * *